United States Patent
Sinha et al.

(10) Patent No.: US 12,086,646 B2
(45) Date of Patent: Sep. 10, 2024

(54) CLOUD-BASED RESOURCE ALLOCATION USING METERS

(71) Applicant: Adobe Inc., San Jose, CA (US)

(72) Inventors: Atanu R. Sinha, Bangalore (IN); Shiv Kumar Saini, Bangalore (IN); Sapthotharan Krishnan Nair, Santa Clara, CA (US); Saarthak Sandip Marathe, Navi Mumbai (IN); Manupriya Gupta, New Delhi (IN); Brahmbhatt Paresh Anand, Vadodara (IN); Ayush Chauhan, Austin, TX (US)

(73) Assignee: Adobe Inc., San Jose, CA (US)

( * ) Notice: Subject to any disclaimer, the term of this patent is extended or adjusted under 35 U.S.C. 154(b) by 457 days.

(21) Appl. No.: 17/674,578

(22) Filed: Feb. 17, 2022

(65) Prior Publication Data

US 2023/0259403 A1    Aug. 17, 2023

(51) Int. Cl.
*G06F 3/00* (2006.01)
*G06F 9/50* (2006.01)
*H04L 47/70* (2022.01)
*H04L 67/10* (2022.01)

(52) U.S. Cl.
CPC .......... *G06F 9/5055* (2013.01); *H04L 47/826* (2013.01); *H04L 67/10* (2013.01)

(58) Field of Classification Search
CPC ........................................................ G06F 9/50
See application file for complete search history.

(56) References Cited

U.S. PATENT DOCUMENTS

| | | | |
|---|---|---|---|
| 2009/0228890 A1* | 9/2009 | Vaitovirta ............. | G06F 9/5027 712/42 |
| 2010/0005473 A1* | 1/2010 | Blanding .............. | G06F 9/5044 718/104 |
| 2014/0348139 A1* | 11/2014 | Gomez Martinez .. | H04W 74/04 370/336 |
| 2017/0372443 A1* | 12/2017 | Katsuda ................. | G16H 50/20 |

(Continued)

OTHER PUBLICATIONS

Mauro Andreolini, Models and Framework for Supporting Runtime Decisions in Web-Based Systems. (Year: 2008).*

(Continued)

*Primary Examiner* — Lechi Truong
(74) *Attorney, Agent, or Firm* — FIG. 1 Patents (57) ABSTRACT

In implementations of systems for cloud-based resource allocation using meters, a computing device implements a resource system to receive resource data describing an amount of cloud-based resources reserved for consumption by client devices during a period of time and a total amount of cloud-based resources consumed by the client devices during the period of time. The resource system determines a consumption distribution using each meter included in a set of meters. Each of the consumption distributions allocates a portion of the total amount of the cloud-based resources consumed to each client device of the client devices. A particular meter used to determine a particular consumption distribution is selected based on a Kendall Tau coefficient of the particular consumption distribution. An amount of cloud-based resources to allocate for a future period of time is estimated using the particular meter and an approximate Shapley value.

20 Claims, 8 Drawing Sheets

(56) References Cited

U.S. PATENT DOCUMENTS

| | | | | |
|---|---|---|---|---|
| 2018/0004900 | A1* | 1/2018 | Katsuda | G16Z 99/00 |
| 2020/0310886 | A1* | 10/2020 | Rajamani | G06F 9/45558 |
| 2021/0026755 | A1* | 1/2021 | Demeilliez | G06F 11/3495 |
| 2022/0035668 | A1* | 2/2022 | de Capoa | G06F 11/3433 |
| 2023/0171202 | A1* | 6/2023 | Dintenfass | H04L 47/781 |
| | | | | 709/226 |

OTHER PUBLICATIONS

"Calculating SaaS Cost Per Tenant: A PoC Implementation in an AWS Kubernetes Environment", Amazon Web Services, Inc. [retrieved Nov. 16, 2021]. Retrieved from the Internet <https://aws.amazon.com/blogs/apn/calculating-saas-cost-per-tenant-a-poc-implementation-in-an-aws-kubernetes-environment/>., Jul. 8, 2019, 11 Pages.

"Calculating Tenant Costs in SaaS Environments", Amazon Web Services, Inc. AWS Partner Network (APN) Blog retrieved [Nov. 16, 2021]. Retrieved from the Internet <https://aws.amazon.com/blogs/apn/calculating-tenant-costs-in-saas-environments/>., Aug. 25, 2017, 10 Pages.

Gosselin, Maurice , "A Review of Activity-Based Costing: Technique, Implementation, and Consequences", in: Handbook of Management Accounting Research vol. 2 [retrieved Nov. 15, 2021]. Retrieved from the Internet <http://ndl.ethernet.edu.et/bitstream/123456789/21261/1/233.pdf#page=178>., 2008, 31 Pages.

Kaplan, Robert S., et al., "Time-Driven Activity-Based Costing", Harvard Business School [retrieved Nov. 15, 2021]. Retrieved from the Internet <http://accounting.teicm.gr/userfiles/files/%CE%9C%CE%95%CE%A4%CE%91%CE%A0%CE%A4%CE%A5%CE%A7%CE%99%CE%91%CE%9A%CE%9F%202015%202016/ABC.pdf>., Nov. 2003, 9 Pages.

Luxner, Tanner , "Cloud Computing Trends: 2021 State of the Cloud Report", Flexera Blog [online][retrieved Nov. 15, 2021]. Retrieved from the Internet <flexera.com/blog/cloud/cloud-computing-trends-2021-state-of-the-cloud-report/>., Mar. 15, 2021, 14 Pages.

Schwanengel, Anna , et al., "Challenges with Tenant-Specific Cost Determination in Multi-Tenant Applications", Cloud Computing 2013 : The Fourth International Conference on Cloud Computing, GRIDs, and Virtualization [retrieved Nov. 16, 2021]. Retrieved from the Internet <http://citeseerx.ist.psu.edu/viewdoc/download?doi=10.1.1.685.2180&rep=rep1&type=pdf>., 2013, 7 Pages.

* cited by examiner

CLOUD-BASED RESOURCE ALLOCATION USING METERS

BACKGROUND

Cloud computing generally refers to on demand delivery of cloud-based resources or services via a network (e.g., the Internet) for consumption by remote computing devices. A cloud resource provider delivers the cloud-based resources to the remote computing devices via the network in response to a request for the cloud-based resources. In one common scenario, the cloud-based resources are requested by a cloud service provider for consumption by remote computing devices during a period of time (e.g., a day, a week, a month, a year, etc.). Some of the remote computing devices that consume the cloud-based resources requested by the cloud service provider are additional cloud service providers. These additional cloud service providers consume the cloud-based resources via additional remote computing devices as part of services offered by the additional cloud service providers.

In order to determine an amount of the cloud-based resources to request for consumption by the remote computing devices (including the additional remote computing devices serviced by the additional cloud service providers) during a future period of time, the cloud service provider attempts to estimate amounts of the cloud-based resources consumed by the remote computing devices during a previous period of time. Estimating the amounts is challenging because the only information available regarding cloud-based resource consumption during the previous period of time are values measured using a meter that is capable of measuring a type of consumption of the cloud-based resources. Examples of types of consumption which are measurable using meters include an amount of data transmitted, an amount of data received, an amount of time using a virtual machine, an amount of electric power used, and so forth If values measured by a meter accurately reflect consumption of the cloud-based resources by the remote computing devices during the previous period of time, then the measured values are usable to estimate an amount of the cloud-based resources to request for the future period of time with greater accuracy. However, it is not possible to determine whether values measured by a meter accurately reflect consumption of the cloud-based resources using conventional techniques. For instance, conventional systems have no means of evaluating whether a particular meter is accurate or whether the particular meter is more accurate than another meter which is a shortcoming of the conventional techniques.

SUMMARY

Techniques and systems are described for cloud-based resource allocation using meters. In an example, a computing device implements a resource system to receive resource data describing an amount of cloud-based resources reserved for consumption by client devices during a period of time and a total amount of cloud-based resources consumed by the client devices during the period of time. Consumption distributions are determined that attribute a portion of the total amount of cloud-based resources consumed to each client device of the client devices. For example, each of the consumption distributions is determined using a meter included in a set of meters and each meter included in the set of meters measures a type of consumption of cloud-based resources.

The resource system selects a particular meter used to determine a particular consumption distribution based on a Kendall Tau coefficient of the particular consumption distribution in one example. For instance, the resource system estimates an amount of cloud-based resources to allocate for a future period of time using the particular meter and an approximate Shapley value computed based on a difference between the amount of cloud-based resources reserved for consumption and the total amount of cloud-based resources consumed. The estimated amount of cloud-based resources is allocated for the future period of time.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Cloud resource providers deliver cloud-based resources (e.g., data storage resources, processing resources, software resources, etc.) to remote client devices for consumption via a network in response to a request for the cloud-based resources. For example, a cloud service provider requests an amount of the cloud-based resources for the remote client devices to consume during a period of time for the benefit of the remote client devices. The cloud service provider does not have information regarding when and/or how the remote client devices will consume the cloud-based resources during the period of time. Because of this, the cloud service provider attempts to estimate amounts of the cloud-based resources consumed by the client devices during a previous period of time using a default meter included in a set of meters.

Each meter included in the set of meters measures a type of consumption of the cloud-based resources. Examples of types of consumption that are measurable using meters include gigabytes of data uploaded, gigabytes of data downloaded, hours of time using a virtual machine, hours of time using a virtual network, etc. For instance, the default meter is selected from the set of meters subjectively, e.g., by a human. If values measured by the default meter accurately reflect consumption of the cloud-based resources by the remote client devices during the previous period of time, then the measured values are usable to estimate an amount of the cloud-based resources to reserve for the period of time with greater accuracy.

However, it is not possible to determine whether values measured by the default meter accurately reflect consumption of the cloud-based resources using conventional techniques. This is at least partially because a type of consumption of the cloud-based resources measured by the default meter in conventional techniques does not capture dependencies between the type of consumption and other types of consumption of the cloud-based resources. Because values measured by the default meter do not reflect these dependencies, conventional systems have no objective means of evaluating whether the default meter is accurate or whether another meter included in the set of meters is more accurate than the default meter.

In order to overcome the limitations of conventional techniques, systems and techniques are described for cloud-based resource allocation using meters. In one example, a computing device implements a resource system to receive resource data that describes an amount of cloud-based resources reserved for consumption by client devices during a period of time and a total amount of cloud-based resources consumed by the client devices during the period of time. For instance, the total amount of the cloud-based resources consumed by the client devices is significantly less than the amount of the cloud-based resources reserved for consumption by the client devices during the period of time.

In an example, the total amount of the cloud-based resources consumed by the client devices is measured using a default meter included in a set of meters. Each meter included in the set of meters is capable of measuring a type of consumption of the cloud-based resources such as an amount of data transmitted, an amount of data received, an amount of time using a virtual machine, an amount of electric power used, and so forth. Consider an example in which the default meter measures virtual machine hours and the client devices use virtual machines included in the cloud-based resources to execute digital workflows.

In this example, about 10 digital workflows are executable per hour by a client device using a virtual machine. However, a single virtual machine is usable by multiple client devices to execute digital workflows simultaneously. Thus, one virtual machine hour measured by the default meter might correspond to 10 digital workflows executed by a single client device or to 30 digital workflows executed by three client devices simultaneously. Accordingly, in this example, values measured by the default meter (e.g., virtual machine hours) do not accurately reflect consumption of the cloud-based resources (e.g., digital workflows executed).

In order to select a meter from the set of meters that is capable of accurately quantifying the cloud-based resources consumed by the client devices during the period of time, the resource system determines a consumption distribution using each meter included in the set of meters. For example, each of the consumption distributions uses values measured by a corresponding meter to attribute a portion of the total amount of the cloud-based resources consumed during the period of time to each client device of the client devices. In this example, the resource system selects a meter from the set of meters that is used to determine a consumption distribution which maximizes two properties.

The first property is that measured values of a meter increase monotonically with the portions of the total amount of the cloud-based resources consumed during the period of time attributed to the client devices. The second property is that measured values of a meter are highly associated with the portion of the total amount of the cloud-based resources consumed during the period of time attributed to the client devices. To identify a meter included in the set of meters that maximizes the first property, the resource system computes a Kendall Tau coefficient for each of the consumption distributions. Similarly, to identify a meter included in the set of meters that maximizes the second property, the resource system computes a Copula-based index for each of the consumption distributions.

The resource system identifies a particular consumption distribution having a highest Kendall Tau coefficient and a highest Copula-based index and selects a particular meter included in the set of meters used to determine the particular consumption distribution. For instance, the resource system estimates an amount of the cloud-based resources to allocate for a future period of time using the particular meter and an approximate Shapley value computed based on a difference between the amount of the cloud-based resources reserved for consumption by the client devices during the period of time and the total amount of the cloud-based resources consumed by the client devices during the period of time. For example, the difference between the amount of the cloud-based resources reserved for consumption and the total amount of the cloud-based resources consumed represents a wasted amount of the cloud-based resources during the period of time. The resource system uses the approximate Shapley value to fairly allocate the wasted amount of the cloud-based resources among the client devices.

By selecting the particular meter from the set of meters based on the Kendall Tau coefficient and the Copula-based index of the particular consumption distribution in this way, the described systems improve a representation of the cloud-based resources consumed by the client devices during the period of time relative to a representation based on values measured using the default meter. Accordingly, using the improved representation to estimate the amount of the cloud-based resources to allocate for a future period of time increases an accuracy of the estimate which also reduces an amount of wasted cloud-based resources during the future period of time. Further, the described systems are usable to select the particular meter from the set of meters automatically and without user intervention which is not possible using conventional systems in which the default meter is selected subjectively, e.g., by a human.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

Figure 1:
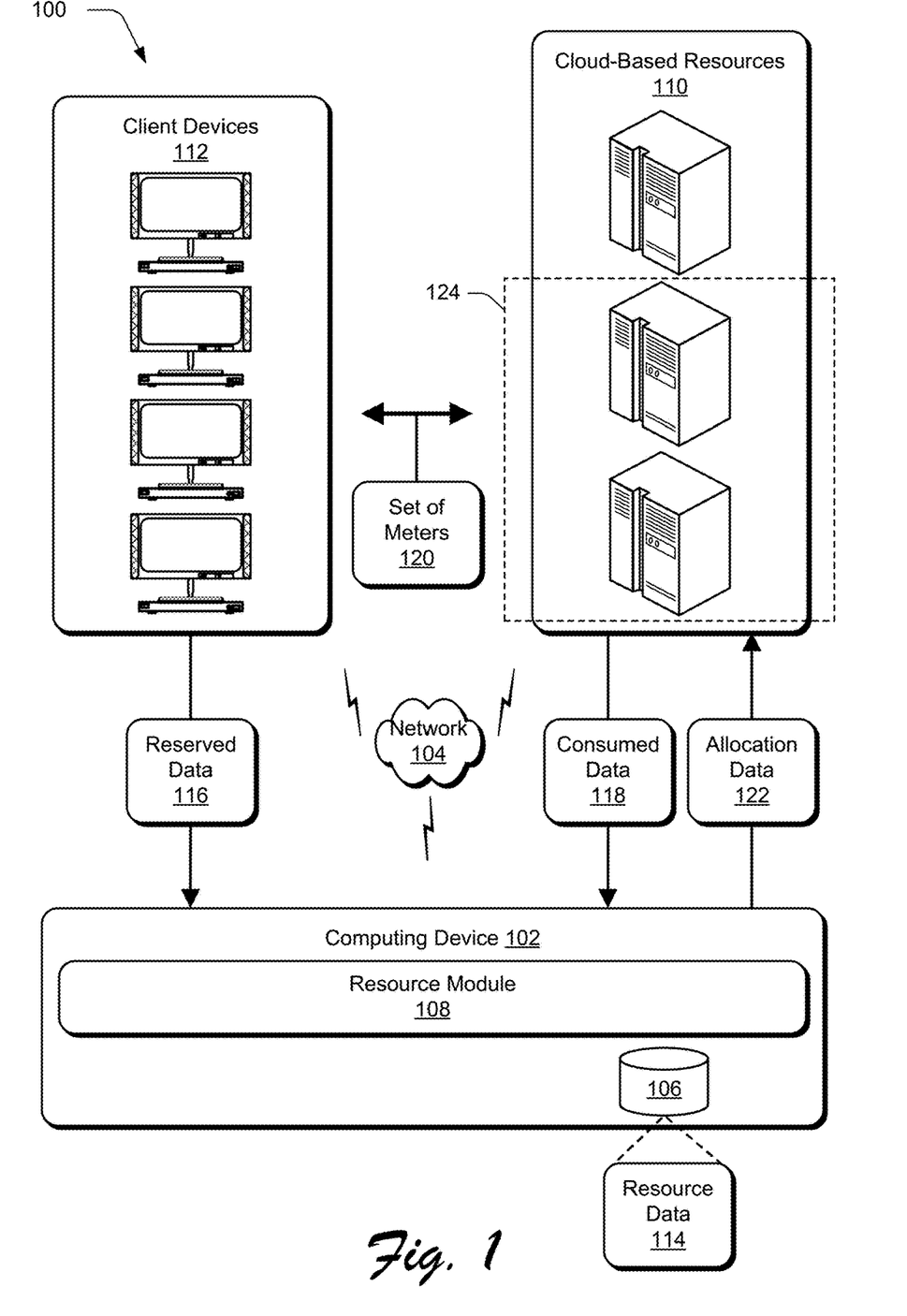
FIG. 1 is an illustration of an environment in an example implementation that is operable to employ digital systems and techniques for cloud-based resource allocation using meters as described herein.

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices).

In the illustrated example, the computing device 102 includes a storage device 106 and a resource module 108. For instance, the computing device 102 implements the resource module 108 to transmit and/or receive data via the network 104. As shown, the environment 100 includes cloud-based resources 110 and client devices 112 which are also connected to the network 104. For example, the cloud-based resources 110 are computing resources (e.g., storage capacity resources, processing resources, network resources, software resources, and so forth) that are allocated by the resource module 108 for consumption by the client devices 112 via the network 104.

In one example, the client devices 112 access the cloud-based resources 110 via the network 104 and the client devices 112 consume the cloud-based resources 110 by performing data analytics, creating digital content, streaming digital content, executing digital workflows, and so forth. For instance, the computing device 102 implements the resource module 108 to allocate an amount of the cloud-based resources 110 for consumption by the client devices 112 during a future period of time. To allocate the amount of the cloud-based resources 110 in one example, the resource module 108 receives resource data 114 via the network 104 which includes reserved data 116 and consumed data 118. The reserved data 116 describes an amount of the cloud-based resources 110 reserved for consumption by the client devices 112 during a period of time. The consumed data 118 describes a total amount of the cloud-based resources 110 consumed by the client devices 112 during the period of time which is measured using a default meter included in a set of meters 120.

For instance, each meter included in the set of meters 120 is capable of measuring a type of consumption of the cloud-based resources 110 such as an amount of data transmitted, an amount of data received, an amount of time using a virtual machine, an amount of electric power used, and so forth. In an example, the set of meters 120 includes a meter configured to measure value core hours, a meter configured to measure ingest request timer counts, a meter configured to measure ingest request latency, etc. Accordingly, the default meter is not necessarily a best meter included in the set of meters 120 for quantifying the total amount of the cloud-based resources 110 consumed by the client devices 112 during the period of time.

Consider an example in which the default meter measures virtual machine hours for a first client device and a second client device included in the client devices 112. In this example, the first client device and the second client device each execute five jobs simultaneously via the network 104 using a single virtual machine included in the cloud-based resources 110 over a period of two hours. The default meter that measures virtual machine hours attributes one hour to the first client device and one hour to the second client device. Thus, a consumption distribution determined using the default meter is one virtual machine hour consumed by the first client device and one virtual machine hour consumed by the second client device. However, a different meter included in the set of meters 120 that measures numbers of jobs executed attributes five jobs to the first client device and five jobs to the second client device. Accordingly, a consumption distribution determined using the different meter is five jobs executed by the first client device and five jobs executed by the second client device.

Continuing the previous example, the different meter included in the set of meters 120 that measures numbers of jobs executed provides a more accurate quantification of the cloud-based resources 110 consumed by the first and second client devices than the default meter that measures virtual machine hours. For instance, the default meter does not distinguish between hours in which a particular virtual machine is used by multiple client devices of the client devices 112 and hours in which the particular virtual machine is used by a single client device of the client devices 112. As a result of this, the consumption distribution determined using the default meter only attributes one virtual machine hour to each of the first and second client devices even though both the first and second client devices used the virtual machine for two hours. For example, if the resource module 108 estimates an amount of the cloud-based resources 110 to allocate for the future period of time using the default meter, then the estimated amount is likely to be too low such that not enough of the cloud-based resources 110 would be available for consumption during the future period of time.

In contrast to the default meter, the different meter that measures numbers of jobs executed attributes all five jobs executed by the first client device to the first client device and attributes all five jobs executed by the second client device to the second client device. For example, if the resource module 108 estimates an amount of the cloud-based resources 110 to allocate for the future period of time using the different meter, then the estimated amount is likely to be sufficient such that enough of the cloud-based resources 110 would be available for consumption during the future period of time. Accordingly, it is important for the resource module 108 to select a meter from the set of meters 120 that accurately quantifies the cloud-based resources 110 consumed by the client devices 112 during the period of time.

In order to select a meter from the set of meters 120 which is capable of accurately quantifying the cloud-based resources 110 consumed by the client devices 112, the resource module 108 determines a consumption distribution using each meter included in the set of meters 120. Each of the consumption distributions uses measured values of a corresponding meter included in the set of meters 120 to attribute a portion of the total amount of the cloud-based resources 110 consumed during the period of time to each client device of the client devices 112. For example, the resource module 108 selects the meter from the set of meters 120 that is used to determine a corresponding consumption distribution which maximizes two properties.

The first property is that measured values of the meter increase monotonically with the portions of the of the total amount of the cloud-based resources 110 consumed during a period of time attributed to the client devices 112. For example, if a measured meter value of a particular client device of the client devices 112 is increased, then a portion of the total amount of the cloud-based resources 110 consumed during the period of time that is attributed to the particular client device does not decrease. The second property is that the meter values of the meter are highly associated with the portions of the total amount of the cloud-based resources 110 consumed during the period of time attributed to the client devices 112. In one example, if a measured meter value of the particular client device of the client devices 112 is increased, then a portion of the total amount of the cloud-based resources 110 consumed during the period of time that is attributed to the particular client device also increases.

In order to maximize the first property, the resource module 108 computes a Kendall Tau coefficient for each of the consumption distributions. Similarly, in order to maximize the second property, the resource module 108 computes a Copula-based index for each of the consumption distributions. The resource module 108 then identifies a particular consumption distribution having a highest Kendall Tau coefficient and a highest Copula-based index and selects a particular meter used to determine the particular consumption distribution from the set of meters 120. In a first example, the particular meter is configured to measure valve core hours. In a second example, the particular meter is configured to measure ingest request timer counts. In a third example, the particular meter is configured to measure ingest request latency.

For example, the default meter is used to determine a current consumption distribution and a Kendall Tau coefficient of the particular consumption distribution is greater than a Kendall Tau coefficient of the current consumption distribution. In this example, a Copula-based index of the particular consumption distribution is greater than a Copula-based index of the current consumption distribution. In one example, the Kendall Tau coefficient and the Copula-based index are not weighted or are weighted equally. In another example, the Kendall Tau coefficient is assigned a greater weight than the Copula-based index. In a third example, the Copula-based index is assigned a greater weight than the Kendall Tau coefficient.

The resource module 108 estimates the amount of the cloud-based resources 110 to allocate for the future period of time using the particular meter and an approximate Shapley value computed based on a difference between the amount of the cloud-based resources 110 reserved for consumption by the client devices 112 during the period of time and the total amount of the cloud-based resources 110 consumed by the client devices 112 during the period of time. For instance, the difference between the amount of the cloud-based resources 110 reserved for consumption by the client devices 112 and the total amount of the cloud-based resources 110 consumed by the client devices 112 is a positive number that represents a wasted amount of the cloud-based resources 110 during the period of time. By computing the approximate Shapley value, the resource module 108 fairly attributes the wasted amount of the cloud-based resources 110 to the client devices 112.

The resource module 108 generates allocation data 122 describing the estimated amount of the cloud-based resources 110 to allocate for the future period of time. For example, the resource module 108 communicates the allocation data 122 via the network 104 to allocate a portion 124 of the cloud-based resources 110 for the future period of time. By identifying the particular consumption distribution having the highest Kendall Tau coefficient and the highest Copula-based index and selecting the particular meter used to determine the particular consumption distribution from the set of meters 120 in this manner, the resource module 108 estimates the amount of the cloud-based resources 110 to allocate for the future period of time using an improved representation of the cloud-based resources 110 consumed during the period of time compared to using the default meter that measures virtual machine hours. This improves an accuracy of the estimated amount of the cloud-based resources 110 and reduces an amount of wasted resources that are reserved for consumption but not consumed during the future period of time.

For example, the improved representation of the cloud-based resources 110 is further usable to predictively distribute the cloud-based resources 110 among the client devices 112. In this manner, the portion 124 of the cloud-based resources 110 is allocatable to the client devices 112 or a portion of the client devices 112 in substantially real time. In some examples, resource module 108 generates allocation data 122 describing the estimated amount of the cloud-based resources 110 and causes the estimated amount of the cloud-based resources 110 to be predictively distributed to the client devices 112. In other examples, the resource module 108 leverages the particular meter to generate training data such as for training a machine learning model.

As used herein, the term "machine learning model" refers to a computer representation that is tunable (e.g., trainable) based on inputs to approximate unknown functions. By way of example, the term "machine learning model" includes a model that utilizes algorithms to learn from, and make predictions on, known data by analyzing the known data to learn to generate outputs that reflect patterns and attributes of the known data. According to various implementations, such a machine learning model uses supervised learning, semi-supervised learning, unsupervised learning, reinforcement learning, and/or transfer learning. For example, the machine learning model is capable of including, but is not limited to, clustering, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. By way of example, a machine learning model makes high-level abstractions in data by generating data-driven predictions or decisions from the known input data.

Consider an example in which the resource module 108 uses the particular meter that accurately quantifies the cloud-based resources 110 consumed by the client devices 112 during the period of time to generate training data based on accurately quantified amounts of the cloud-based resources 110 consumed by the client devices 112 during prior periods of time. In this example, the resource module 108 trains a machine learning model to predictively allocate/distribute the cloud-based resources 110 among the client devices 112 using the training data. Once trained, the machine learning model receives an input that accurately quantifies the cloud-based resources 110 consumed by the client devices 112 during the period of time and the machine learning model generates a predicted amount of the cloud-based resources 110 to allocate for the future period of time as an output. For instance, the resource module 108 generates the allocation data 122 as describing the predicted amount of the cloud-based resources 110 output by the machine learning model and causes a predicted distribution of the amount of the cloud-based resources 110 among the client devices 112 during the future period of time.

Figure 2:
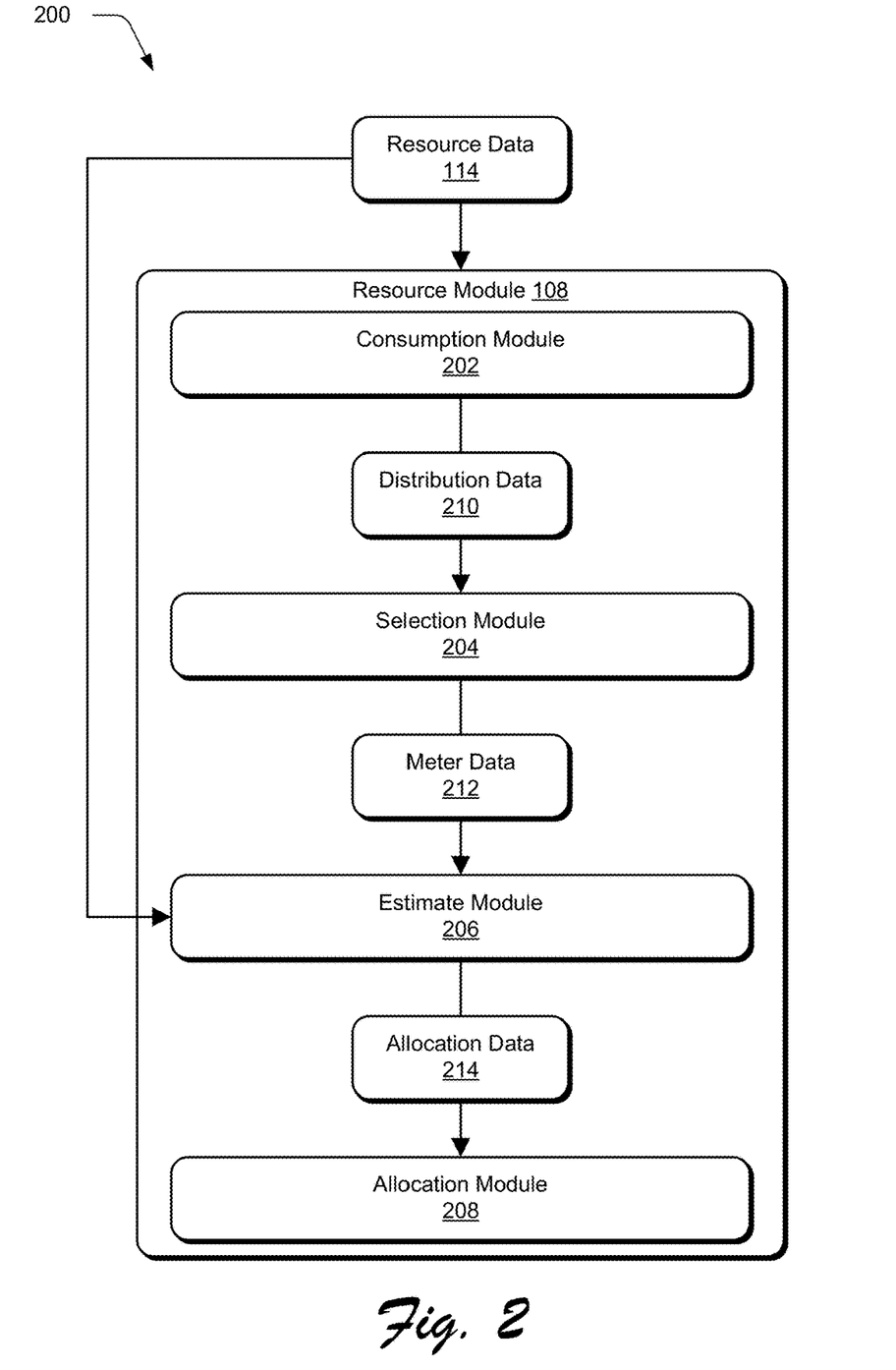
FIG. 2 depicts a system in an example implementation showing operation of a resource module for cloud-based resource allocation using meters.

FIG. 2 depicts a system 200 in an example implementation showing operation of a resource module 108. The resource module 108 is illustrated to include a consumption module 202, a selection module 204, an estimate module 206, and an allocation module 208. For example, the consumption module 202 receives resource data 114 describing an amount of the cloud-based resources 110 reserved for consumption by the client devices 112 during a period of time and a total amount of the cloud-based resources 110 consumed by the client devices 112 during the period of time.

Figure 3:
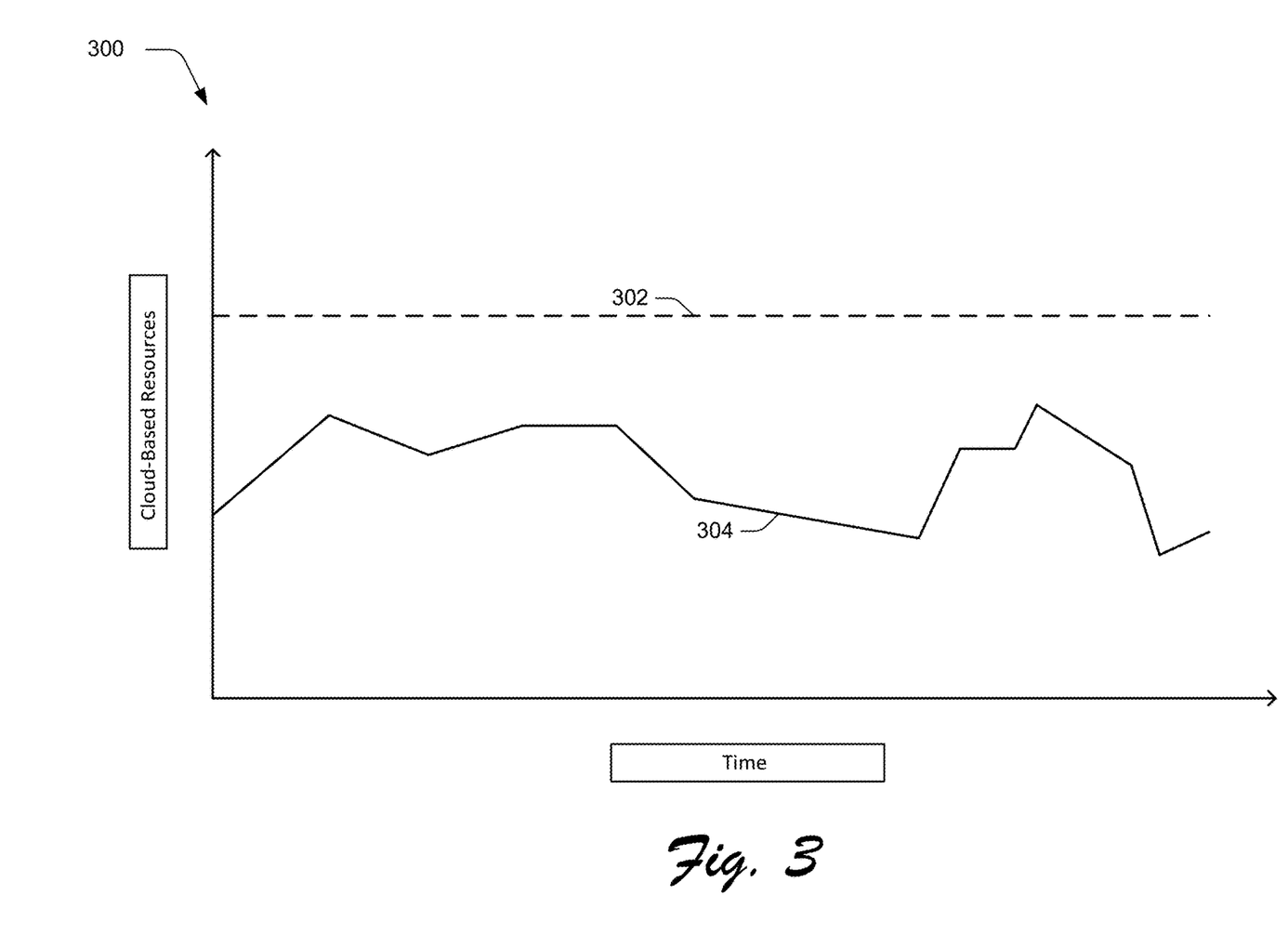
FIG. 3 illustrates a representation of resource data.

FIG. 3 illustrates a representation 300 of resource data 114. As shown, indicator 302 represents the amount of the cloud-based resources 110 reserved for consumption by the client devices 112 during the period of time. Indicator 304 represents the total amount of the cloud-based resources 110 consumed by the client devices 112 during the period of time measured by a default meter included in the set of meters 120. For example, the default meter measures values which each correspond to an amount of the cloud-based resources 110 consumed by a client device included in the client devices 112 at a particular point in time during the period of time. In this example, a point of the indicator 304 corresponding to the particular point in time represents a sum of all of the values measured by the default meter at the particular point in time. For instance, a difference between the indicator 302 and the indicator 304 represents a wasted amount of the cloud-based resources 110 during the period of time.

With reference to FIG. 2, the consumption module 202 processes the resource data 114 to generate distribution data 210. To do so in one example, the consumption module 202 determines a consumption distribution for each meter included in the set of meters 120. For example, a consumption distribution for a particular meter includes a set of values measured by the particular meter and each measured value corresponds to an amount of the cloud-based resources 110 consumed by a client device included in the client devices 112 during the period of time.

For instance, the consumption module 202 determines a consumption distribution for a different meter included in the set of meters 120 by using the different meter to measure the total amount of the cloud-based resources 110 consumed by the client devices 112 during the period of time. The consumption module 202 then determines a consumption distribution for an additional different meter included in the set of meters 120 by using the additional different meter to measure the total amount of the cloud-based resources 110 consumed by the client devices 112 during the period of time. The consumption module 202 continues to determine consumption distributions for different meters included in the set of meters 120 until a consumption distribution has been determined for each meter included in the set of meters 120. The consumption module 202 generates the distribution data 210 as describing the determined consumption distribution for each meter included in the set of meters 120.

The selection module 204 receives the distribution data 210 and processes the distribution data 210 to generate meter data 212. For example, the selection module 204 computes a Kendall Tau coefficient for each consumption distribution described by the distribution data 210. In one example, the is representable as:

$$\tau = \frac{N_C - N_D}{\binom{n}{2}}$$

where: $\tau$ is a Kendall Tau coefficient of a consumption distribution for a meter included in the set of meters 120; n is a total number of values measured by the meter that correspond to amounts of the cloud-based resources 110 consumed; $N_C$ is a number of concordant pairs of the values measured by the meter that correspond to amounts of the cloud-based resources 110 consumed; and $N_D$ is a number of discordant pairs of the values measured by the meter that correspond to amounts of the cloud-based resources 110 consumed.

In an example, the selection module 204 also computes a Copula-based index for each of the consumption distributions described by the distribution data 210. In this example, the Copula-based index of a consumption distribution indicates an association or a dependence between values measured by a meter used to determine the consumption distribution and amounts of the cloud-based resources 110 consumed that correspond to the values measured by the meter. In some examples, the selection module 204 computes the Copula-based index as described by Karra et al., *Copula Index for Detecting Dependence and Monotonicity between Stochastic Signals*, arXiv:1703.06686v5 [stat.ML] (6 Oct. 2018). In one example, the selection module 204 computes the Copula-based index for each of the consumption distributions described by the distribution data 210 as a modified Kendall Tau coefficient computed over monotonic regions of each of the consumption distributions (e.g., to indicate non-linear dependence).

Figure 4:
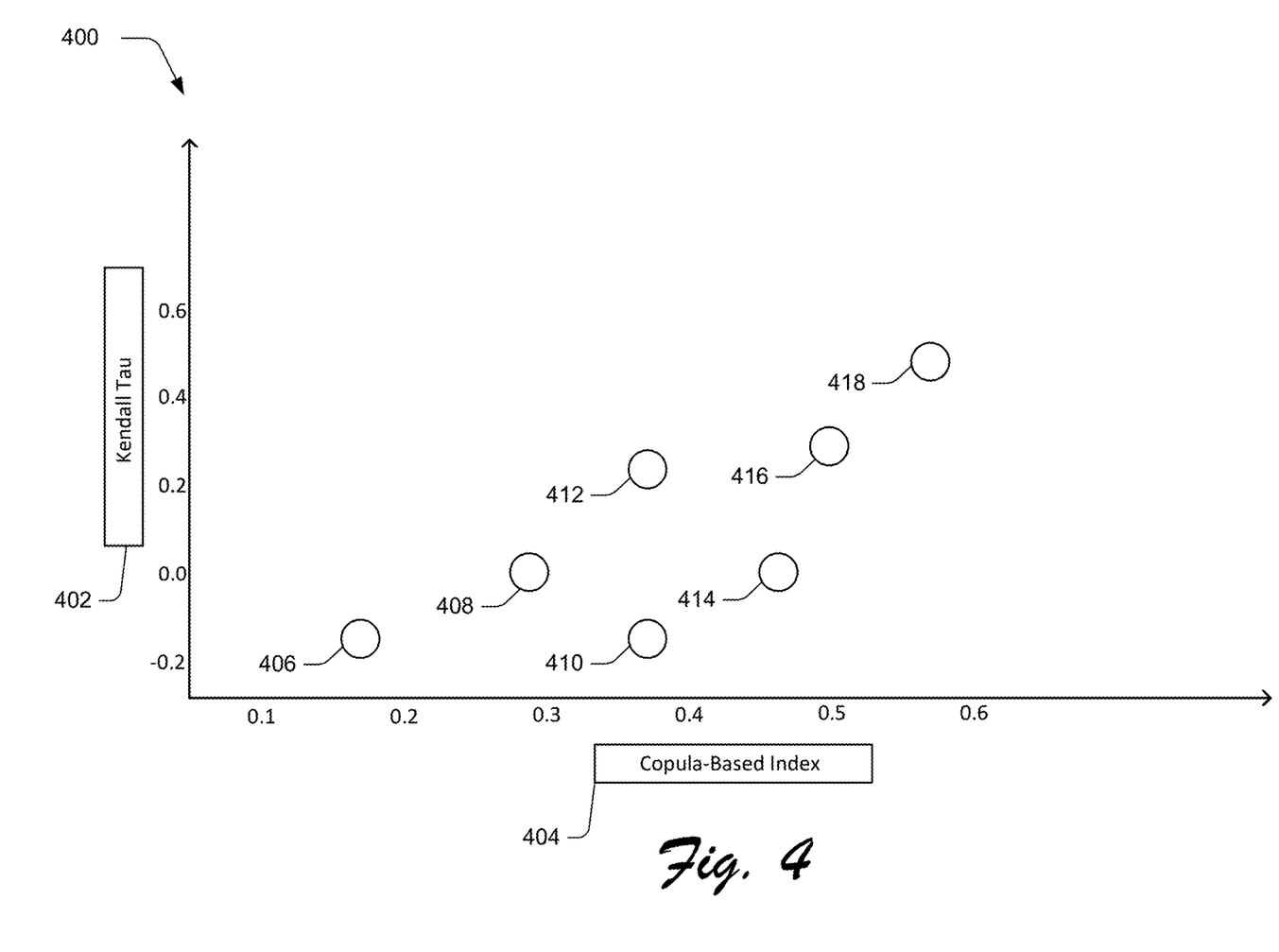
FIG. 4 illustrates a representation of selecting a particular meter included in a set of meters.

The selection module 204 then leverages the Kendall Tau coefficients and the Copula-based indices of the consumption distributions to select a particular meter included in the set of meters 120. FIG. 4 illustrates a representation 400 of selecting a particular meter included in a set of meters. As shown, the representation 400 depicts example meters included in the set of meters 120 organized by Kendall Tau coefficients 402 and Copula-based indices 404 of consumption distributions determined using the example meters. For instance, the set of meters 120 includes meters 406-418. The selection module 204 selects meter 418 as having a highest associated Kendall Tau coefficient and a highest associated Copula-based index of the meters 406-418. For example, the meter 418 is the particular meter included in the set of meters 120. The selection module 204 generates the meter data 212 as describing the meter 418 which is the particular meter in this example.

The estimate module 206 receives the meter data 212 and the resource data 114 and the estimate module 206 processes the meter data 212 and/or the resource data 114 to generate allocation data 214. For example, the estimate module 206 processes the meter data 212 and/or the resource data 114 to estimate an amount of the cloud-based resources 110 to allocate for a future period of time using the meter 418 and an approximate Shapley value computed based on a difference between the amount of the cloud-based resources 110 reserved for consumption during the period of time (represented by the indicator 302) and the total amount of the cloud-based resources 110 consumed during the period of time (represented by the indicator 304). In some examples, the estimate module 206 computes the approximate Shapley value in a manner as described by Roth et al., *The Shapley Value as Applied to Cost Allocation: A Reinterpretation*, Journal of Accounting Research, Vol. 17, No. 1 (1979) and/or Fatima et al., *A Linear Approximation Method for the Shapley Value*, Artificial Intelligence, Vol. 172, Issue 14, pages 1673-1699, (2008). For instance, estimate module 206 computes the approximate Shapley value to fairly attribute the wasted amount of the cloud-based resources 110 during the period of time to the client devices 112. In one example, the estimate module 206 computes the approximate Shapley value to attribute a portion of the wasted amount of the cloud-based resources 110 to each client device included in the client devices 112.

Figure 5:
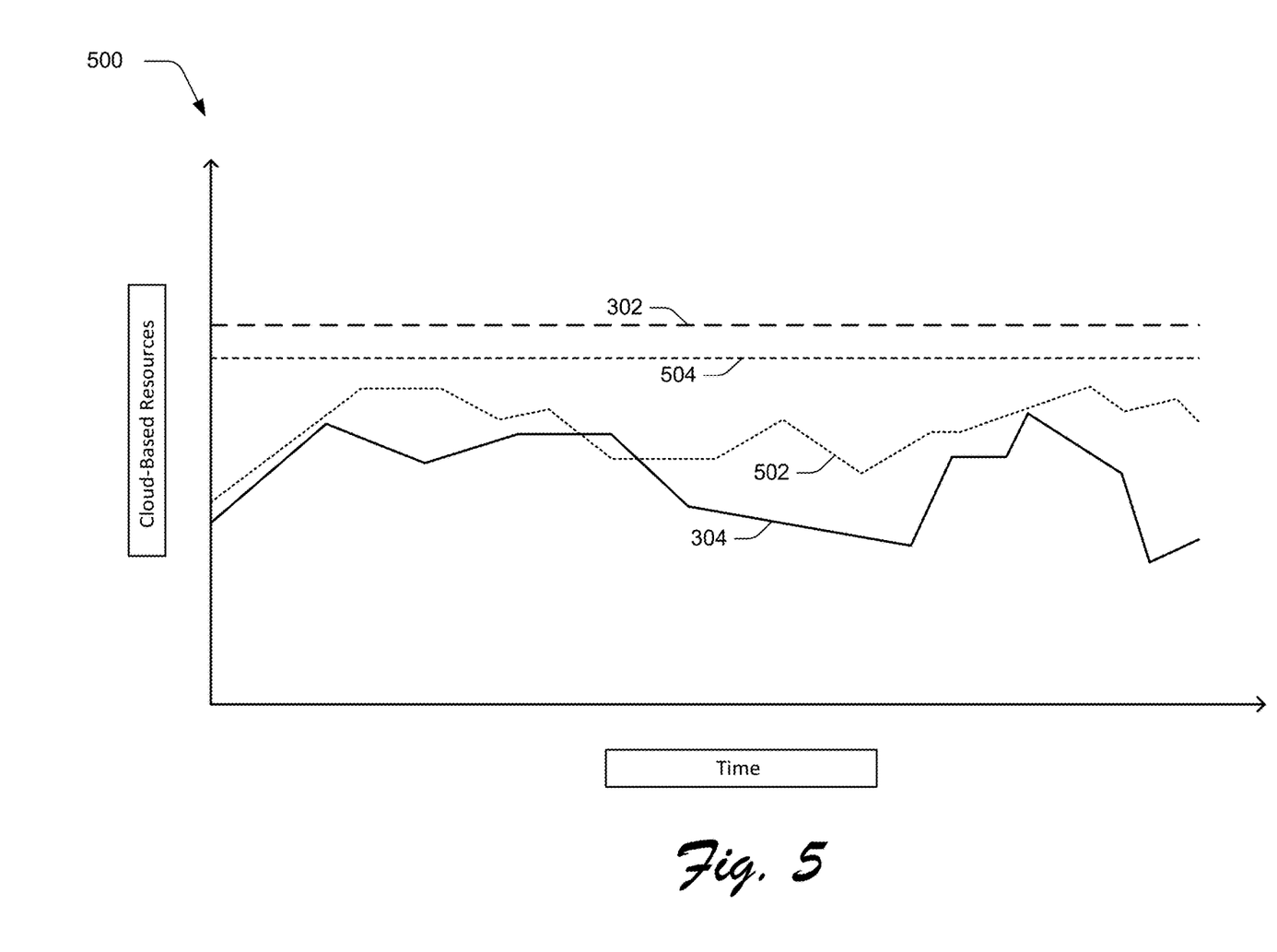
FIG. 5 illustrates a representation of estimating an amount of cloud-based resources to allocate for a future period of time using a particular meter.

FIG. 5 illustrates a representation 500 of estimating an amount of cloud-based resources to allocate for a future period of time using a particular meter. As shown, an estimated amount of the cloud-based resources 110 consumed by the client devices 112 during the future period of time is represented by indicator 502. An estimated amount of the cloud-based resources 110 to allocate for the future period of time is represented by indicator 504. The estimate module 206 generates the allocation data 214 as describing the estimated amount of the cloud-based resources 110 to allocate for the future period of time (represented by the indicator 504). The allocation module 208 receives the allocation data 214 and processes the allocation data 214 to allocate the estimated amount of the cloud-based resources 110 for the future period of time. For instance, the allocation module 208 communicates the allocation data 214 via the network 104 to allocate the portion 124 of the cloud-based resources 110 for the future period of time.

For example, by selecting the meter 418 based on the Kendall Tau coefficient and the Copula-based index of a consumption distribution determined using the meter 418, the resource module 108 improves a representation of the total amount of the cloud-based resources 110 consumed during the period of time. By using the improved representation of the total amount of the cloud-based resources 110 consumed during the period of time to estimate the amount of the cloud-based resources 110 to allocate for the future period of time, the resource module 108 also increases an accuracy of this estimate relative to an estimate based on the default meter included in the set of meters 120. In some examples, the resource module 108 leverages the increased accuracy of the estimated amount of the cloud-based resources 110 to reduce a safety margin applied to the amount of the cloud-based resources 110 reserved for consumption during the future period of time which results in a smaller amount of wasted cloud-based resources 110 for the future period of time compared to the period of time. For example, a difference between the indicator 302 and the indicator 304 which represented the wasted amount of the cloud-based resources 110 during the period of time is greater than a difference between the indicator 504 and the indicator 502 which represents a wasted amount of the cloud-based resources 110 during the future period of time.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

Figure 6:
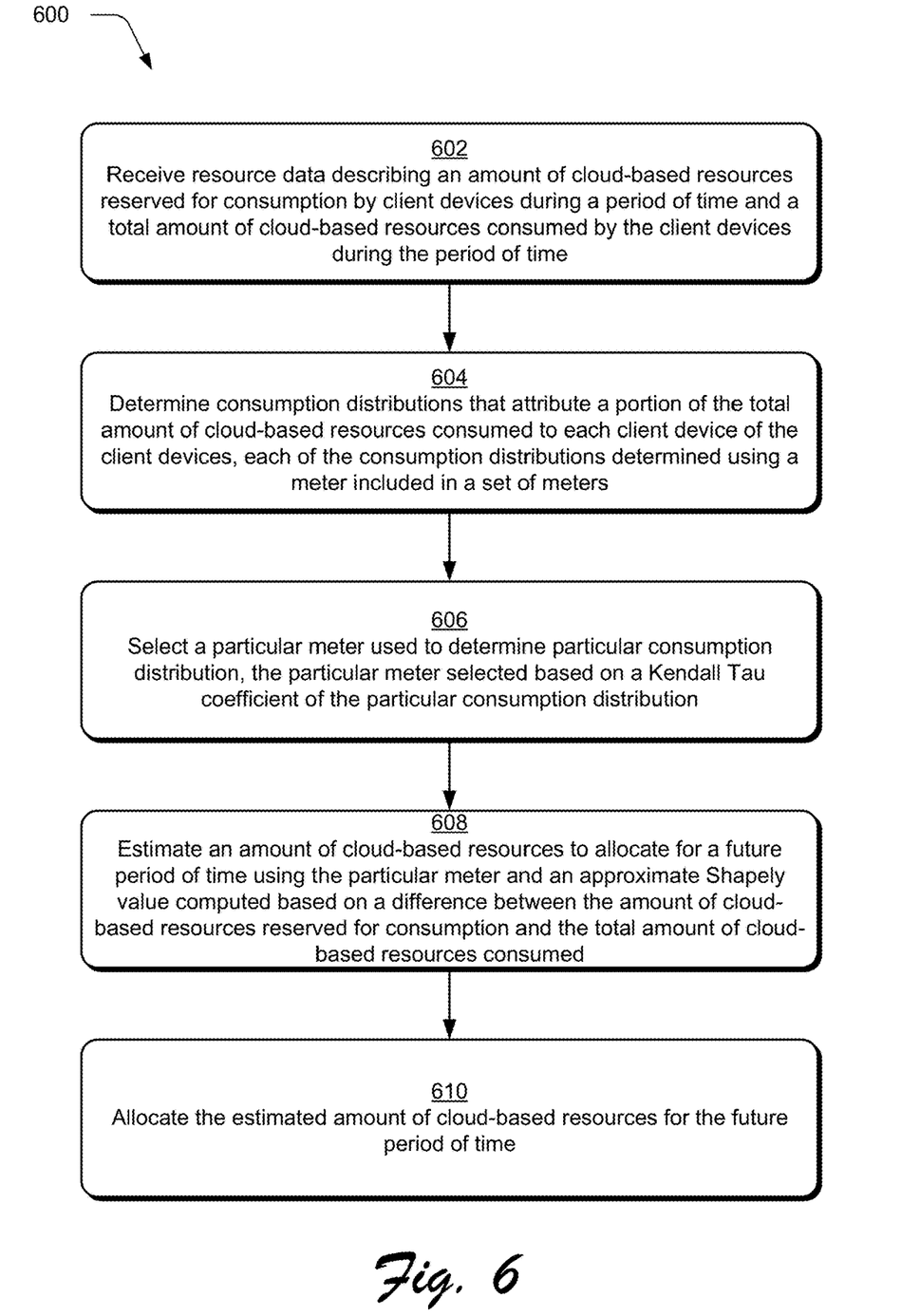
FIG. 6 is a flow diagram depicting a procedure in an example implementation in which an estimated amount of cloud-based resources is allocated for a future period of time.

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-5. FIG. 6 is a flow diagram depicting a procedure 600 in an example implementation in which an estimated amount of cloud-based resources is allocated for a future period of time.

Resource data is received describing an amount of cloud-based resources reserved for consumption by client devices during a period of time and a total amount of the cloud-based resources consumed by the client devices during the period of time (block 602). The computing device 102 implements the resource module 108 to receive the resource data in one example. Consumption distributions are determined (block 604) that attribute a portion of the total amount of cloud-based resources consumed to each client device of the client devices, each of the consumption distributions determined using a meter included in a set of meters. For example, the resource module 108 determines the consumption distributions.

A particular meter used to determine a particular consumption distribution is selected based on a Kendall Tau coefficient of the particular consumption distribution (block 606). In one example, the computing device 102 implements the resource module 108 to select the particular meter. An amount of cloud-based resources to allocate for a future period of time is estimated using the particular meter and an approximate Shapley value computed based on a difference between the amount of cloud-based resources reserved for consumption and the total amount of cloud-based resources consumed (block 608). For example, the resource module 108 estimates the amount of cloud-based resources to allocate for the future period of time. The estimated amount of cloud-based resources is allocated for the future period of time (block 610). In an example, the computing device 102 implements the resource module 108 to allocate the estimated amount of cloud-based resources for the future period of time.

Figure 7:
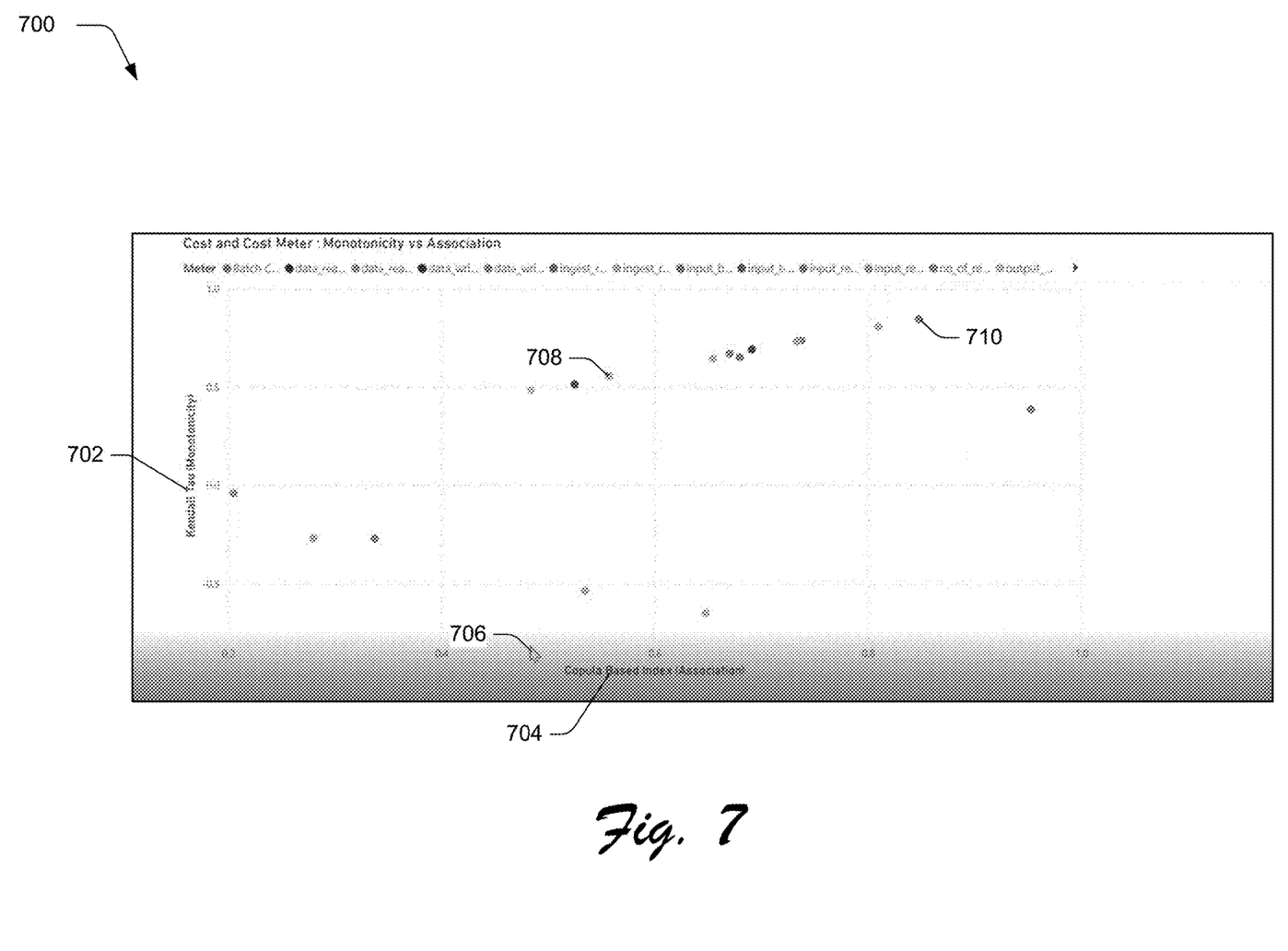
FIG. 7 illustrates an example user interface for cloud-based resource allocation using meters.

FIG. 7 illustrates an example user interface 700 for cloud-based resource allocation using meters. As illustrated in FIG. 7, the user interface 700 includes representations of different meters included in the set of meters 120 which are displayed based on Kendall Tau coefficients 702 and Copula-based indices 704 computed from consumption distributions determined using the different meters included in the set of meters 120. For example, a user interacts with an input device (e.g., a mouse, a stylus, a touchscreen, a keyboard, etc.) relative to the user interface 700 to manipulate a cursor 706 within the user interface 700.

The user interface 700 includes a representation of the default meter 708 included in the set of meters 120 and the particular meter 710 included in the set of meters 120. For example, the default meter 708 measures valve core hours and the particular meter 710 measures ingest request timer counts. In one example, the default meter 708 measures valve core hours and the particular meter 710 measures ingest request latency. In another example, the default meter 708 measures virtual machine hours and the particular meter 710 measures numbers of workflows executed.

As shown, a Kendall Tau coefficient for the particular meter 710 is greater than a Kendall Tau coefficient for the default meter 708. Accordingly, a monotonicity between values measured by the particular meter 710 and corresponding amounts of the cloud-based resources 110 consumed is greater than a monotonicity between values measured by the default meter 708 and corresponding amounts of the cloud-based resources 110 consumed. Similarly, a Copula-based index for the particular meter 710 is significantly greater than the Copula-based index for the default meter 708. Thus, an association between the values measured by the particular meter 710 and the corresponding amounts of the cloud-based resources 110 consumed is greater than an associate between the values measured by the default meter 708 and the corresponding amounts of the cloud-based resources 110 consumed.

Example Improvements

Table 1 below presents results of an objective comparison between accuracies of estimated amounts of the cloud-based resources 110 to allocate for a future period of time using the default meter from the set of meters 120 and the particular meter from the set of meters 120. The estimated amounts of the cloud-based resources 110 to allocate for the future period of time using the default meter and the particular meter are compared with an actual amount of the cloud-based resources 110 consumed during the future period of time to compute a root-mean-square error for several categories of the cloud-based resources 110 which are also presented in Table 1.

TABLE 1

Root-Mean-Square Error for Default Meter and Particular Meter

| Category | Default Meter | Particular Meter |
| --- | --- | --- |
| Bandwidth | 20.90 | 4.46 |
| Storage | $2.26e^{-5}$ | $1.57e^{-6}$ |
| Virtual Machines | 281933 | 8145 |
| Virtual Network | $3.2e^{-5}$ | $2.61e^{-5}$ |

As shown in Table 1 above, the amount of the cloud-based resources 110 estimated using the particular meter included in the set of meters 120 is more accurate than the amount of the cloud-based resources 110 estimated using the default meter included in the set of meters 120 for each category considered. For the categories of Bandwidth, Storage, and Virtual Machines, the root-mean-square error associated with the particular meter is an order of magnitude lower than the root-mean-square error associated with the default meter.

Example System and Device

Figure 8:
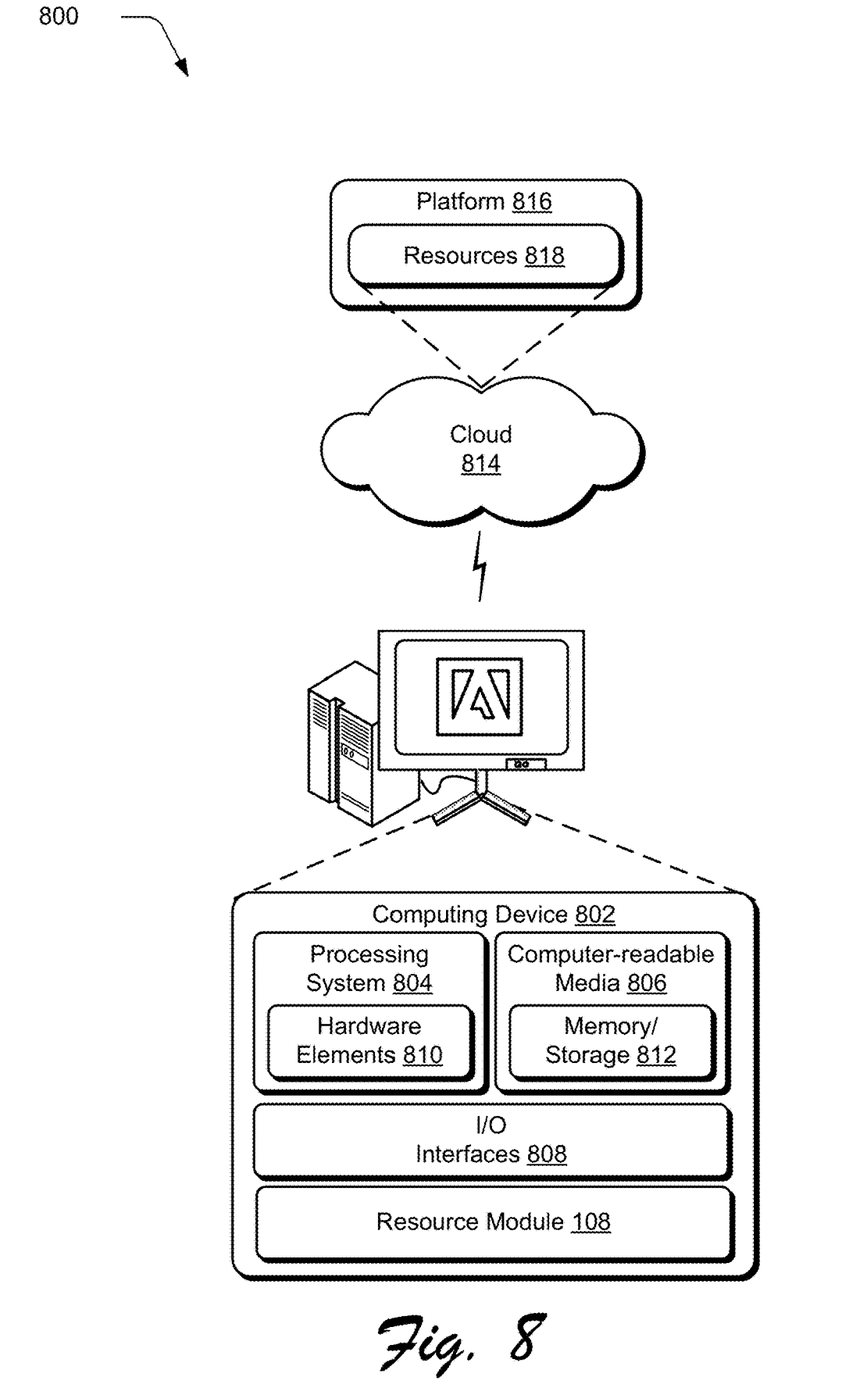
FIG. 8 illustrates an example system that includes an example computing device that is representative of one or more computing systems and/or devices for implementing the various techniques described herein.

FIG. 8 illustrates an example system 800 that includes an example computing device that is representative of one or more computing systems and/or devices that are usable to implement the various techniques described herein. This is illustrated through inclusion of the resource module 108. The computing device 802 includes, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that are configured as processors, functional blocks, and so forth. This includes example implementations in hardware as an application specific integrated circuit or other logic device formed using one or more semiconductors. The hardware elements 810 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 806 is illustrated as including memory/storage 812. The memory/storage 812 represents memory/storage capacity associated with one or more computer-readable media. In one example, the memory/storage 812 includes volatile media (such as random access memory (RAM)) and/or nonvolatile media (such as read only memory (ROM), Flash memory, optical disks, magnetic disks, and so forth). In another example, the memory/storage 812 includes fixed media (e.g., RAM, ROM, a fixed hard drive, and so on) as well as removable media (e.g., Flash memory, a removable hard drive, an optical disc, and so forth). The computer-readable media 806 is configurable in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 802. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 802, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 810. For example, the computing device 802 is configured to implement particular instructions and/or functions corresponding to the software and/or hardware modules. Accordingly, implementation of a module that is executable by the computing device 802 as software is achieved at least partially in hardware, e.g., through use of computer-readable storage media and/or hardware elements 810 of the processing system 804. The instructions and/or functions are executable/operable by one or more articles of manufacture (for example, one or more computing devices 802 and/or processing systems 804) to implement techniques, modules, and examples described herein.

The techniques described herein are supportable by various configurations of the computing device 802 and are not limited to the specific examples of the techniques described herein. This functionality is also implementable entirely or partially through use of a distributed system, such as over a "cloud" 814 as described below.

The cloud 814 includes and/or is representative of a platform 816 for resources 818. The platform 816 abstracts underlying functionality of hardware (e.g., servers) and software resources of the cloud 814. For example, the resources 818 include applications and/or data that are utilized while computer processing is executed on servers that are remote from the computing device 802. In some examples, the resources 818 also include services provided over the Internet and/or through a subscriber network, such as a cellular or Wi-Fi network.

The platform 816 abstracts the resources 818 and functions to connect the computing device 802 with other computing devices. In some examples, the platform 816 also serves to abstract scaling of resources to provide a corresponding level of scale to encountered demand for the resources that are implemented via the platform. Accordingly, in an interconnected device embodiment, implementation of functionality described herein is distributable throughout the system 800. For example, the functionality is implementable in part on the computing device 802 as well as via the platform 816 that abstracts the functionality of the cloud 814.

CONCLUSION

Although implementations of systems for cloud-based resource allocation using meters have been described in language specific to structural features and/or methods, it is to be understood that the appended claims are not necessarily limited to the specific features or methods described. Rather, the specific features and methods are disclosed as example implementations of systems for cloud-based resource allocation using meters, and other equivalent features and methods are intended to be within the scope of the appended claims. Further, various different examples are described and it is to be appreciated that each described example is implementable independently or in connection with one or more other described examples.

What is claimed is:

1. In a digital medium environment for cloud-based resource allocation, a method implemented by a computing device, the method comprising:

receiving, by the computing device, resource data describing an amount of cloud-based resources reserved for consumption by client devices during a period of time and a total amount of cloud-based resources consumed by the client devices during the period of time;

determining, by the computing device, consumption distributions that attribute a portion of the total amount of cloud-based resources consumed to each client device of the client devices, each of the consumption distributions determined using a meter included in a set of meters;

selecting, by the computing device, a particular meter used to determine a particular consumption distribution, the particular meter selected based on a Kendall Tau coefficient of the particular consumption distribution;

estimating, by the computing device, an amount of cloud-based resources to allocate for a future period of time using the particular meter and an approximate Shapley value computed based on a difference between the amount of cloud-based resources reserved for consumption and the total amount of cloud-based resources consumed; and allocating, by the computing device, the estimated amount of cloud-based resources for the future period of time.

2. The method as described in claim 1, wherein the particular meter is selected based on a Copula-based index of the particular consumption distribution.

3. The method as described in claim 1, further comprising distributing the estimated amount of cloud-based resources among the client devices during the future period of time.

4. The method of claim 1, wherein the approximate Shapley value attributes a portion of the difference to each client device of the client devices based on values of the particular meter.

5. The method as described in claim 1, wherein the particular meter is configured to measure valve core hours.

6. The method as described in claim 1, wherein the particular meter is configured to measure ingest request timer counts.

7. The method as described in claim 1, wherein the particular meter is configured to measure ingest request latency.

8. The method as described in claim 1, wherein the difference is a positive number that represents an amount of wasted cloud-based resources during the period of time and the approximate Shapley value attributes a portion of the amount of wasted cloud-based resources to each client device of the client devices.

9. The method as described in claim 1, wherein the Kendall Tau coefficient is greater than a Kendall Tau coefficient of a current consumption distribution determined using a default meter that measured the total amount of cloud-based resources consumed.

10. The method as described in claim 9, wherein a Copula-based index of the particular consumption distribution is greater than a Copula-based index of the current consumption distribution.

11. A system comprising:
a consumption module implemented at least partially in hardware of a computing device to:
receive resource data describing an amount of cloud-based resources reserved for consumption by client devices during a period of time and a total amount of cloud-based resources consumed by the client devices during the period of time; and
determine consumption distributions that attribute a portion of the total amount of cloud-based resources consumed to each client device of the client devices, each of the consumption distributions determined using a meter included in a set of meters;
a selection module implemented at least partially in the hardware of the computing device to select a particular meter used to determine a particular consumption distribution, the particular meter selected based on a Copula-based index of the particular consumption distribution;
an estimate module implemented at least partially in the hardware of the computing device to estimate an amount of cloud-based resources to allocate for a future period of time using the particular meter and an approximate Shapley value computed based on a difference between the amount of cloud-based resources reserved for consumption and the total amount of cloud-based resources consumed; and
an allocation module implemented at least partially in the hardware of the computing device to allocate the estimated amount of cloud-based resources for the future period of time.

12. The system as described in claim 11, wherein the particular meter is selected based on a Kendall Tau coefficient of the particular consumption distribution.

13. The system as described in claim 11, wherein the particular meter is configured to measure valve core hours, ingest request timer counts, or ingest request latency.

14. The system as described in claim 11, wherein the approximate Shapley value attributes a portion of the difference to each client device of the client devices based on values of the particular meter.

15. The system as described in claim 11, wherein the Copula-based index is greater than a Copula-based index of a current consumption distribution determined using a default meter that measured the total amount of cloud-based resources consumed.

16. One or more computer-readable storage media comprising instructions stored thereon that, responsive to execution by a computing device, causes the computing device to perform operations including:
receiving resource data describing an amount of cloud-based resources reserved for consumption by client devices during a period of time and a total amount of cloud-based resources consumed by the client devices during the period of time;
determining consumption distributions that attribute a portion of the total amount of cloud-based resources consumed to each client device of the client devices, each of the consumption distributions determined using a meter included in a set of meters;
selecting a particular meter used to determine a particular consumption distribution, the particular meter selected based on a Kendall Tau coefficient and a Copula-based index of the particular consumption distribution;
estimating an amount of cloud-based resources to allocate for a future period of time using the particular meter and an approximate Shapley value computed based on a difference between the amount of cloud-based resources reserved for consumption and the total amount of cloud-based resources consumed; and
allocating the estimated amount of cloud-based resources for the future period of time.

17. The one or more computer-readable storage media as described in claim 16, wherein the particular meter is configured to measure valve core hours, ingest request timer counts, or ingest request latency.

18. The one or more computer-readable storage media as described in claim 16, wherein the difference is a positive number that represents an amount of wasted cloud-based resources during the period of time and the approximate Shapley value attributes a portion of the amount of wasted cloud-based resources to each client device of the client devices.

19. The one or more computer-readable storage media as described in claim 16, wherein the cloud-based resources include an amount of bandwidth, an amount of storage capacity, or an amount of time using a virtual machine.

20. The one or more computer-readable storage media as described in claim 16, wherein the Kendall Tau coefficient is greater than a Kendall Tau coefficient of a current consumption distribution determined using a default meter that measured the total amount of cloud-based resources consumed.

* * * * *